United States Patent [19]

Reich et al.

[11] 4,414,347
[45] Nov. 8, 1983

[54] CYANOACRYLATE ADHESIVE COMPOSITION

[75] Inventors: Karl Reich, Carlsberg; Heinz Sieger, Eppelheim, both of Fed. Rep. of Germany

[73] Assignee: Teroson GmbH, Heidelberg, Fed. Rep. of Germany

[21] Appl. No.: 418,496

[22] Filed: Sep. 15, 1982

[51] Int. Cl.³ .............................................. C08K 5/43
[52] U.S. Cl. .................................... 524/168; 524/169
[58] Field of Search ............... 524/168, 169; 560/137, 560/148; 564/79; 526/298

[56] References Cited

U.S. PATENT DOCUMENTS

| | | | |
|---|---|---|---|
| 2,765,332 | 10/1956 | Coover et al. | 526/298 |
| 2,855,375 | 10/1958 | Dobay | 524/169 |
| 3,454,606 | 7/1969 | Brotherton et al. | 560/148 |
| 3,455,892 | 7/1969 | Froelich | 564/79 |
| 3,527,841 | 9/1970 | Wicker et al. | 526/298 |
| 3,856,786 | 12/1974 | Huber | 560/148 |
| 3,915,931 | 10/1975 | Gilleo et al. | 524/168 |

OTHER PUBLICATIONS

Onodera, R., Chemical Abstracts, vol. 57, 14932g (1962).
Appel, Rolf and Gerber, Hermann: Chem. Ber. 91, pp. 1200-1203 (1958).

Primary Examiner—Veronica P. Hoke
Attorney, Agent, or Firm—Howard J. Troffkin

[57] ABSTRACT

A rapid setting α-cyanoacrylate-based adhesive composition having an improved stabilizer therein. The stabilizer is a sulfamide derivative containing the group

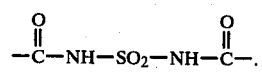

Stabilizing may be further improved by using the sulfamides in combination with phenolic anti-oxidants, particularly sterically hindered phenols, without reducing the curing rate of the composition.

5 Claims, 1 Drawing Figure

CYANOACRYLATE ADHESIVE COMPOSITION

BACKGROUND OF INVENTION

The present invention relates to a α-cyanoacrylate-based adhesive composition having good storage stability.

α-cyanoacrylates of general formula

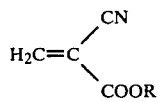

are rapid-setting adhesives which are ideally suited for the adhesion of a large number of materials like rubber, plastics, metal, leather and wood in various technical areas like machine construction, apparatus construction, electrical engineering, jewelery industry, watch-maker industry, household etc. The parts can be joined in an extremely short time of only a few seconds and the adhesive joints produced in this way have good mechanical strength characteristics. The reactive monomers forming the one-component adhesive are hardened mostly in the absence of a catalyst by anionic polymerization initiated by even small traces of extremely weak basic-acting compounds (Lewis bases) such as, for example, water (e.g. surface moisture) when applied as a thin film between the parts to be joined.

Due to the extreme reactivity of these adhesives usually inhibition of premature polymerisation which has an adverse effect on storage stability is required. Accordingly in the past acidic gases as sulphur dioxide, nitrogen monoxide, carbon dioxide, hydrogen fluoride etc. have been added to these adhesives. Furthermore proton acids including mineral acids like hydrochloric acid, sulphuric acid and polyphosphoric acid, anhydrides like phosphoric anhydride, sulfonic acids and carboxylic acids like acetic acid, itaconic acid and benzenesulfonic acid have been used as stabilizers. Typical patents relating to the aforementioned stabilizers are U.S. Pat. Nos. 2,765,332, 2,794,788, 2,756,251, 2,912,454, 2,926,188, 3,728,375, 3,993,678 and DE-OS No. 23 07 834.

However, gaseous stabilizers are only suited to a limited degree for effective stabilization of α-cyanoacrylates since metering in the liquid adhesive is difficult and during storage undefined amounts can prematurely escape. When using higher concentrations of acidic gases or non-gaseous acids the curing rate of the α-cyanoacrylates rapidly decreases. On the other hand when using too low concentrations no sufficient stabilization is achieved.

It has now been surprisingly found that the above difficulties and disadvantages of the prior art stabilizers can be obviated by the use of certain compounds described herein below as stabilizers contained in α-cyanoacrylate-based adhesive compositions. These compounds can be easily added in well defined amounts in form of solid or liquid substances, require only limited concentrations in the resulting adhesive compositions based on α-cyanoacrylate and lead to improved storage stability. Furthermore the efficiency of conventional stabilizers is greatly enhanced when combined with these compounds.

DETAILED DESCRIPTION OF INVENTION

Figure 1:
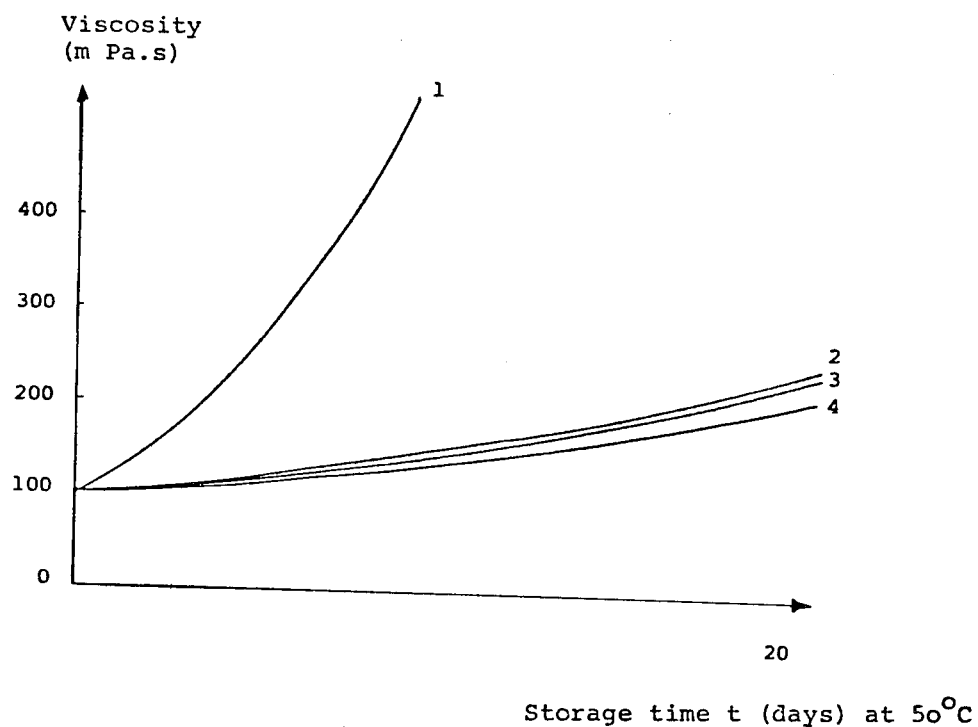

The present invention is directed to adhesive compositions based on α-cyanoacrylate and which contain a stabilizer and may contain conventional additives as described herein and in the appended claims.

The generally known α-cyanoacrylates which serve as a basis for the adhesive compositions according to the invention are of general formula:

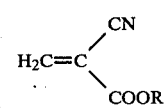

wherein R is straight or branched-chain alkyl group such as methyl, ethyl, n-propyl, isopropyl, n-butyl, isobutyl, pentyl, hexyl, and the like as well as a halogen atom or alkoxy group substitued alkyl such as 2-chloroethyl, 3-chloropropyl, 2-chlorobutyl, trifluoroethyl, 2-methoxyethyl, 3-methoxybutyl, 2-ethoxyethyl group and the like; a straight or branched-chain alkenyl group such as allyl, methallyl, crotyl and the like; a straight or branched-chain alkinyl group such as propargyl and the like; cycloalkyl group such as cyclohexyl, and the like; an ether group X—O—Y or X—O—X—O—Y in which X is a saturated alkylene group having 2 to 4 carbon atoms and Y is an alkyl group having 2 to 6 carbon atoms; an aryl group such as phenyl and the like; or an aralkyl group, such as benzyl, cresyl and the like. Further, German published application DE-OS No. 2,816,836 refers to a large number of suitable α-cyanoacrylates which are incorporated herein by reference. The adhesive compositions according to the invention may, in addition, contain conventional additives such as thickeners, plastisizers, polymerization catalysts, further copolymerizable monomers, solvents, perfumes, dyes, pigments, etc. Of course, the adhesive compositions according to the invention may additionally contain conventional polymerization inhibitors. These additives are conventionally known, form part of the prior art and examples of them are described in the hereinabove mentioned references. Based on the total weight of the adhesive compositions according to the invention those additives are usually present in an amount of less than 10%.

The subject stabilizers contained in the adhesive compositions according to the invention are sulfamide derivates containing the group

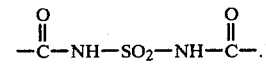

Sulfamide derivatives used according to the invention are preferably compounds of the following general formula

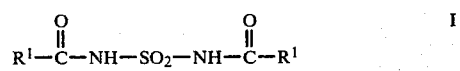

In this formula, the radicals $R^1$ are the same or different and in each case stand for hydrogen or for linear or branched-chain alkyl with 1 to 18 carbon atoms, cycloalkyl with 3 to 8 carbon atoms, phenylmethyl or alkoxy —$OR^2$, where $R^2$ is a linear or branched-chain alkyl with 1 to 18 carbon atoms, cycloalkyl with 3 to 8 carbon atoms, phenyl, phenylalkyl with 1 to 4 carbon atoms in the alkyl group, or alkylphenyl with 1 to 4 carbon atoms in the alkyl group or groups. $R^1$ can also be trifluoro- or trichloromethyl or alkoxy $-OR^2$, wherein $R^2$ is diphenyl- or triphenylmethyl.

N,N'-diacyl-sulfamides have long been known. Thus, C. H. Anderson and E. F. Degering describe in Proc. Indiana Acad. Sci. 1946, 56, 134–135 the preparation of certain representatives of this class of compounds with a yield of 55% of theory by acylating sulfamide in the absence of solvents in accordance with the following equation:

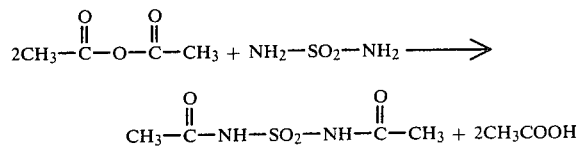

German Pat. No. 876,846 describes a modified process which is also based on the acylation of sulfamide. A yield of 78% of theory is given therein for the preparation of N,N'-diacetyl sulfamide.

As the preparation of sulfamide is a time-consuming and complicated process (cf HOUBEN-WEYL, Methoden der Organischen Chemie, Vol. XI/2, 4th edition, 1958, 713) and provides sulfamide with only 44% yield, it was of interest to develop a process for supplying the desired N,N'-diacyl sulfamides with high yield and purity.

It has surprisingly been found that in sulfuryl diisocyanate $OCN-SO_2-NCO$ both isocyanate groups react smoothly with carboxylic acid providing N,N'-diacyl sulfamides in high yields:

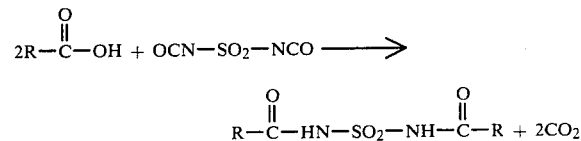

It is merely necessary to heat the two components in an organic solvent until $CO_2$ evolution stops. This generally requires at a temperature of 70° to 80° C. a time of 1 to 2 hours. The sulfuryl diisocyanate required as the starting substance can be obtained by the process of German Pat. No. 940,351 (cf also HOUBEN-WEYL, Methoden der Organischen Chemie, VOl. XI/2, 4th edition, 1958, 724).

With particular advantage, the reactants used are aliphatic carboxylic acids and R can be hydrogen, a linear or branched-chain $C_1-C_{18}$ alkyl group or a $C_3-C_8$ alkyl group or a benzyl group.

The above process has made it possible to prepare for the first time N,N'-diformyl sulfamide and N,N'-bis-(cyclohexylcarbonyl)-sulfamide, neither of which are described in the literature.

Through the selection of a suitable solvent in which the starting substances are soluble but the desired end product is insoluble, the latter slowly crystallizes and is obtained with a high purity and does not have to be recrystallized.

It has proved advantageous for certain uses to perform the reaction in a solvent in which the end product is also soluble. This is, for example, the case if N,N'-diacyl sulfamides are to be further processed in the form of a solution, so that it is unnecessary to redissolve the reaction products. According to a specific embodiment of the invention, tetrahydrofuran is used as a solvent, because the latter participates in the reaction through polymerization giving stabilizers which are not precipitated from the solution during dilution with inert solvents such as benzene, and this greatly facilitates the use according to the invention as stabilizer in α-cyanoacrylate-based adhesives.

N,N'-bis-(alkoxycarbonyl)-sulfamides and N,N'-bis-(aryloxycarbonyl)-sulfamides can be obtained in quantitative yield by adding the corresponding alcohols or phenols to sulfuryl diisocyanate:

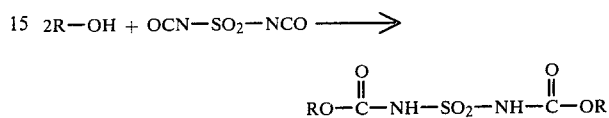

cf U.S. Pat. No. 3,326,967, R. Appel and H. Gerber, Chem.Ber. 91, 1200–1203 (1958), N. Onodera, Kogyo Kagaku Zasshi 65, 790–793 (1962), U.S. Pat. No. 3,420,867.

It has been unexpectedly found that the use of the adhesive compositions containing the sulfamide derivatives of general formula I according to the present invention exhibit improved stability during storage. Due to the advantageous action of the stabilizers presently described, it is only necessary to add small quantities of 0.0001 to 0.1% by weight and preferably 0.001 to 0.05% by weight (based on the total weight of the adhesive compositions) to the α-cyanoacrylate adhesives to obtain excellent storage properties. In addition, it has been found that the curing rate of α-cyanoacrylate adhesive compositions is not impaired by adding the stabilizers according to the present invention.

As mentioned before conventional additives can be added to the adhesive compositions according to the invention. Thus, common inhibitors for the radical polymerization can be added to the stabilized α-cyanoacrylate-based adhesives. Such inhibitors are for example quinone, hydroquinone, p-methoxyphenol, pyrogallol etc. These inhibitors can be added in a concentration of 0.0001 to 1% by weight based on the total weight of the adhesive composition.

The properties of the adhesive compositions according to the invention can be further improved by adding phenolic stabilizers (anti-oxidants). The phenolic anti-oxidants can be added in the same amounts as the sulfamide derivatives, but depending from the storage conditions and the proposed use of the adhesive composition also smaller or greater amounts of phenolic stabilizers can be used. Accordingly 0.0001 to 1% by weight of phenolic stabilizer based on the total weight of the adhesive composition are mostly sufficient.

Phenols according to the following general formula

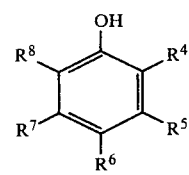

III are suitable as co-stabilizers; in the formula the radicals $R^4, R^5, R^7$ and $R^8$ in each case stand for hydrogen or an alkyl group with 1 to 4 carbon atoms and the radical $R^6$ either has the same meaning or is a hydroxy or methoxy group.

Preference is given to sterically hindered phenols, 2,5-di-tert.-butyl hydroquinone having proved particularly advantageous.

As mentioned before the adhesive compositions according to the invention may contain conventional additives. Thus, for example when joining porous materials it is desired to increase the viscosity by adding a thickener to avoid that the adhesive penetrates the pores of the surfaces to be adhered to one another. Furthermore, the setting times of the adhesive according to the invention especially on porous/acidic surfaces can be reduced by polymerization catalysts like podands as disclosed in German published applications DE-OS No. 3,025,127 and DE-OS No. 3,109,220 which are herein incorporated by reference. Such modifications are sufficiently described in the literature.

The following examples are given for illustrative purposes only and are not meant to be a limitation on the subject invention except as defined by the claims appended hereto. All parts and percentages are by weight unless otherwise indicated.

EXAMPLE 1

Preparation of N,N'-diacetyl-sulfamide 12 g of anhydrous acetic acid are dissolved in 150 ml of absolute benzene and 14.8 g of sulfuryl diisocyanate (prepared in accordance with German Pat. No. 940,351) are added dropwise within 20 minutes at ambient temperature, accompanied by stirring. The temperature rises from 21° to 39° C. and $CO_2$ evolution as well as a precipitation of a colorless precipitate occur. The reaction mixture is heated by means of an oil bath to 60° C. accompanied by stirring until the evolution of the gas is at an end, which takes 2 hours. The reaction mixture is cooled, the precipitate removed by suction filtering and dried at 60° C. 17.8 g of colorless crystals are obtained (98.8% of theory), m.p. 167°–169° C. (decomp.) which can be recrystallized from isopropanol and acetic acid.

The IR-spectrum shows bands at 3220 cm$^{-1}$ (NH-stretching vibration), 1710 cm$^{-1}$ (C=O-stretching vibration) and 1490/1170 cm$^1$ (asymmetric and symmetric $SO_2$-stretching vibration).

The $^1$H-NMR spectrum (DMSO-d$^6$) has the following absorptions: $\delta=1.96$ ppm, s, 6 H for the two $CH_3$ groups, $\delta=12.10$ ppm, s wide, 2 H, exchangeable with $D_2O$, for the two NH groups.

Elementary analysis: Calculated for $C_4H_8N_2O_4S$: C 26.66%; H 4,48%; N 15.55%. Found: C 26.64%; H 4.35%; N 15.65%.

The same process is used for the preparation of the following N,N'-diacyl sulfamides:

| R | Yield | m.p. |
| --- | --- | --- |
| H | 91% | 147–148° C. |
| ethyl | 96% | 152–153° C. |
| n-propyl | 89% | 148–151° C. |
| cyclohexyl | 88% | 179–182° C. |
| benzyl | 84% | 174–175° C. |

EXAMPLE 2

Reaction of sulfuryl diisocyanate with acetic acid in tetrahydrofuran 36 g of anhydrous acetic acid are placed in 200 ml of absolute tetrahydrofuran and 44,4 g of sulfuryl diisocyanate are added dropwise within 20 minutes accompanied by stirring. The temperature rises up to the reflux temperature of the tetrahydrofuran. This is accompanied by $CO_2$ evolution, which ends after 2 hours. The tetrahydrofuran is evaporated in vacuo and the residue in the form of a slightly cloudy, viscous, yellow oil is diluted with absolute benzene. A small amount of yellow flakes forms and settles at the bottom. The clear benzene solution is evaporated in vacuo. 100.1 g of a yellow, viscous oil are left behind which does not crystallize even after prolonged standing. A preparation prepared in this way has all the properties of N,N'-diacetyl sulfamide with regard to the stabilizing effect in α-cyanoacrylate-based adhesives. However, it has the advantage of excellent solubility therein.

The trifluoromethyl derivative is prepared in the same way.

EXAMPLE 3

Preparation of N,N'-bis-(benzyloxycarbonyl)-sulfamide 10 g of anhydrous benzyl alcohol are placed in 150 ml of absolute benzene and 7.4 g of sulfuryl diisocyanate are added dropwise accompanied by stirring. The exothermic reaction which takes place leads to a rise in the temperature to 45° C. and shortly after the start a precipitate is formed. Following the temperature drop, stirring is continued for 1 hour at ambient temperature. The resulting precipitate is suction filtered and dried at 60° C. giving a yield of 18.06 g of colorless crystals (99.2% of theory), m.p. 139°–141° C., which can be recrystallized from ethanol.

IR spectrum: 3290/3210 cm$^{-1}$ (NH-stretching vibration), 1755 cm$^{-1}$ (C=O stretching vibration), 1495/1150 cm$^{-1}$ (asymmetric and symmetric $SO_2$ stretching vibration) and 1225 cm$^{-1}$ (C—O stretching vibration).

$^1$H-NMR spectrum (acetone-d$^6$): $\delta=5.18$ ppm, s, 4 H for the two —$OCH_2$ groups, $\delta=7.35$ ppm, s, 10 H for the two phenyl radicals, $\delta=10.7$ ppm, s, wide, 2 H, exchangeable with $D_2O$, for the two NH groups.

Elementary analysis: Calculated for $C_{16}H_{16}N_2O_6S$: C 52.74%; H 4.43%; N 7.69%. Found: C 52.40%; H 4.34%; N 7.74%.

The same process is used for the preparation in a quantitative yield of the following addition products:

| R | m.p. (found) |
| --- | --- |
| —$OCH_3$ | 163–165° C. |
| —$OC_2H_5$ | 168–169° C. |
| —$OC_3H_7(n)$ | 137° C. |
| —$OC_4H_9(n)$ | 78–79° C. |
| —$OC(CH_3)_3$ | 152–153° C. |
| —$OC_6H_5$ | 153–154° C. |

EXAMPLE 4

Several stabilizers according to the invention as stated in table 1 were added to freshly distilled monomeric ethyl-2-cyanoacrylate containing 0.01% by weight hydroquinone and 20 ppm $SO_2$. The obtained adhesives were thickened with polymethylmethacrylate and tested in an accelerated ageing test at 50° C. The change of viscosity as a measure for the stability is plotted in FIG. 1.

After 20 days of accelerated ageing the stabilized α-cyanoacrylate-based adhesives according to the invention only exhibited a minor increase in viscosity and save short setting times on various substrates before and also after accelerated ageing.

In the same manner methyl-, $C_3$–$C_{20}$-alkyl-, cycloalkyl-, alkoxyalkyl- and phenyl-2-cyanoacrylate as well as mixtures of these esters were tested. The results obtained were basically the same.

TABLE 1

| Sulfamide derivative | Stabilizer concentration (ppm) | Thickener PMMA (% by weight) |
|---|---|---|
| $\overset{O}{\underset{\|\|}{R-C}}-NH-SO_2-NH-\overset{O}{\underset{\|\|}{C-R}}$ R = | | |
| 1. no stabilizer | — | 5 |
| 2. methyl | 100 | 5 |
| 3. benzyloxy | 100 | 5 |
| 4. trifluoromethyl | 100 | 5 |

While the invention has been described in connection with certain preferred embodiments, it is not intended to limit the invention to the particular form set forth, but, on the contrary, it is intended to cover such alternatives, modifications and equivalents as defined by the appendend claims.

What we claim is:

1. An α-cyanoacrylate-based adhesive compositions containing a sulfamide compound of the general formula $$R^1-\overset{O}{\underset{\|\|}{C}}-NH-SO_2-NH-\overset{O}{\underset{\|\|}{C}}-R^1$$

in which the groups $R^1$ are each a radical separately selected from the group consisting of hydrogen, linear or branched alkyl with 1 to 18 carbon atoms, cycloalkyl with 3 to 8 carbon atoms, phenyl methyl, trifluoro- or trichloromethyl or alkoxy —$OR^2$, $R^2$ being selected from the group consisting of linear or branched alkyl with 1 to 18 carbon atoms, cycloakyl with 3 to 8 carbon atoms, phenyl, di- or triphenylmethyl, phenylalkyl with 1 to 4 carbon atoms in the alkyl group, or alkylphenyl with 1 to 4 carbon atoms in the alkyl radical.

2. The adhesive composition of claim 1 in which the sulfamide derivative is the reaction product of sulfuryl diisocyanate with a carboxylic acid $R^1COOH$ (in which $R^1$ is defined as above but may not be an alkoxy radical) in tetrahydrofuran.

3. The adhesive composition of claim 1 wherein said composition contains 0.0001 to 0.01% by weight of the sulfamide derivative.

4. The adhesive composition according to claim 1, 2 or 3, which additionally contains a phenolic anti-oxidant.

5. The adhesive composition of claim 4 wherein the phenolic anti-oxidant is a phenol of the general formula

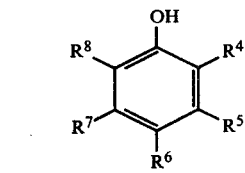

in which $R^4$, $R^5$, $R^7$ and $R^8$ are each a radical selected from hydrogen and lower alkyl with 1 to 4 carbon atoms, and in which the group $R^6$ is a radical selected from the group consisting of hydrogen, lower alkyl with 1 to 4 carbon atoms, hydroxy or methoxy.

* * * * *